(12) United States Patent
Martin et al.

(10) Patent No.: US 10,007,434 B1
(45) Date of Patent: Jun. 26, 2018

(54) PROACTIVE RELEASE OF HIGH PERFORMANCE DATA STORAGE RESOURCES WHEN EXCEEDING A SERVICE LEVEL OBJECTIVE

(71) Applicant: EMC Corporation, Hopkinton, MA (US)

(72) Inventors: Owen Martin, Hopedale, MA (US); Malak Alshawabkeh, Franklin, MA (US); Hui Wang, Upton, MA (US); Sean Dolan, Southborough, MA (US); Xiaomei Liu, Southborough, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 64 days.

(21) Appl. No.: 15/195,154

(22) Filed: Jun. 28, 2016

(51) Int. Cl.
G06F 3/06 (2006.01)
G06F 12/02 (2006.01)

(52) U.S. Cl.
CPC .......... *G06F 3/0605* (2013.01); *G06F 3/0649* (2013.01); *G06F 3/0683* (2013.01); *G06F 12/023* (2013.01); *G06F 2212/1041* (2013.01); *G06F 2212/261* (2013.01)

(58) Field of Classification Search
CPC .............................. G06F 3/0649; G06F 3/0647
See application file for complete search history.

(56) References Cited

U.S. PATENT DOCUMENTS

| | | | | |
|---|---|---|---|---|
| 7,822,847 | B2 * | 10/2010 | Kusama | G06F 9/50 709/224 |
| 8,370,597 | B1 | 2/2013 | Chatterjee et al. | |
| 8,447,946 | B2 * | 5/2013 | Nakatogawa | G06F 3/061 707/812 |
| 8,935,493 | B1 * | 1/2015 | Dolan | G06F 3/0649 711/117 |
| 8,935,500 | B1 * | 1/2015 | Gulati | G06F 3/0613 711/114 |
| 8,966,216 | B1 | 2/2015 | Marshak et al. | |
| 9,223,613 | B2 | 12/2015 | Mathur et al. | |
| 9,258,364 | B2 * | 2/2016 | Carr | G06F 3/0605 |
| 9,323,682 | B1 | 4/2016 | Marshak et al. | |
| 2006/0236073 | A1 * | 10/2006 | Soules | G06F 3/0613 711/216 |
| 2009/0300283 | A1 * | 12/2009 | Kudo | G06F 3/061 711/114 |

(Continued)

*Primary Examiner* — Midys Rojas
*Assistant Examiner* — Khoa D Doan
(74) *Attorney, Agent, or Firm* — BainwoodHuang

(57) ABSTRACT

High performance storage resources are proactively deallocated when a storage group exceeds its service level objective. A load score is calculated for each unit of storage allocated from a high performance physical disk group. A minimum load score is determined that is the lowest load score calculated for the storage units allocated from the high performance disk group to the storage group. When the storage group service level objective is exceeded, a demotion threshold is calculated equal to a product of the minimum load score and a demotion range factor. A demotion set is determined made up of storage units allocated from the high performance disk group having load scores less than or equal to the demotion threshold. Host data stored on the demotion set is migrated to storage from a lower performance disk group, and the high performance units of storage in the demotion set are released for re-allocation.

19 Claims, 4 Drawing Sheets

(56) References Cited

U.S. PATENT DOCUMENTS

| | | | | |
|---|---|---|---|---|
| 2011/0179219 A1* | 7/2011 | Ma | ........................ | G06F 3/0613 |
| | | | | 711/103 |
| 2011/0197027 A1* | 8/2011 | Balasubramanian | ... | G06F 3/061 |
| | | | | 711/117 |
| 2011/0246740 A1* | 10/2011 | Yata | ...................... | G06F 3/0611 |
| | | | | 711/165 |
| 2014/0181400 A1* | 6/2014 | Lin | ...................... | G06F 3/0613 |
| | | | | 711/114 |
| 2014/0195760 A1* | 7/2014 | Iwamitsu | .............. | G06F 3/0604 |
| | | | | 711/165 |
| 2014/0380332 A1* | 12/2014 | Mathur | ................... | H04L 29/06 |
| | | | | 718/104 |

\* cited by examiner

PROACTIVE RELEASE OF HIGH PERFORMANCE DATA STORAGE RESOURCES WHEN EXCEEDING A SERVICE LEVEL OBJECTIVE

BACKGROUND

Data storage systems are arrangements of hardware and software that typically include multiple storage processors coupled to arrays of non-volatile storage devices, such as magnetic disk drives, electronic flash drives, and/or optical drives. The storage processors service I/O operations that arrive from host machines. The received I/O operations specify storage objects that are to be written, read, created, or deleted. The storage processors run software that manages incoming I/O operations and performs various data processing tasks to organize and secure the host data stored on the non-volatile storage devices.

In some previous data storage systems, non-volatile storage devices have been organized into physical disk groups based on the level of performance they provide. Storage from the physical disk groups has been allocated across multiple storage groups, in order to meet service level objectives (SLOs) of the storage groups. Each storage group includes a set of storage objects (e.g. logical disks or "LUNs") that are used by one or more applications to store data. The service level objective for each storage group indicates an average response time target for I/O operations performed on the storage objects within the storage group.

When the pattern of I/O operations performed on a storage group causes the storage group to begin missing its service level objective, an increased amount of high performance storage resources may be allocated to that storage group, from a physical disk group containing high performance non-volatile storage, in order to reduce the average response time for I/O operations performed on the storage objects within the storage group. For example, when the performance of a storage group begins to miss its service level objective, in order to improve the performance of the storage group, host data that is most frequently accessed within the storage group may be migrated to storage resources allocated from the high performance disk group. By allocating storage resources from the high performance disk group to store the most frequently accessed host data in the storage group, previous systems have been able to reduce the average response time for I/O operations to the storage group, in order to cause the storage group to resume meeting its service level objective.

SUMMARY

Unfortunately, previous systems have exhibited significant shortcomings. In particular, previous systems have not effectively deallocated high performance storage that was previously allocated to a storage group from a high performance disk group after the storage group resumes meeting its service level objective. As storage continues to be allocated from the high performance disk group, if deallocation is not performed, the storage available for allocation from the high performance disk group may become completely depleted. Moreover, as host data access patterns change, specific units of host data within the storage group that were formerly "hot", i.e. frequently accessed, may become "cold", i.e. rarely accessed. Storage allocated from a high performance disk group should not continue to be used to store formerly "hot" data after that data has become "cold", since lower cost storage allocated from a lower performance disk group could be used instead without significantly impacting performance, thus reducing overall storage costs.

To address these and other shortcomings of previous systems, improved techniques are disclosed herein for proactively releasing high performance storage resources when a storage group is exceeding its service level objective. In the disclosed techniques, units of storage are allocated to one or more storage groups from multiple physical disk groups. Each of the storage groups has an associated service level objective. The physical disk groups include a high performance disk group, and at least one lower performance disk group. A load score is calculated for each unit of storage allocated to a storage group from the high performance disk group. A minimum load score is then determined that is the lowest load score among the load scores calculated for the units of storage allocated from the high performance disk group to the storage group.

The disclosed system monitors I/O operation patterns to determine whether the service level objective associated with the storage group is being exceeded. For example, the disclosed system may periodically determine whether the service level objective associated with the storage group is being exceeded by greater than a safety margin of performance, where the value of the safety margin reflects the total I/O operation load being experienced by the storage group, and the difference between the current performance of the storage group and the service level objective. Only if the service level objective for the storage group is being exceeded by greater than the safety margin does the disclosed system detect that the service level objective associated with the storage group is being exceeded.

In response to detecting that the service level objective associated with the storage group is being exceeded, a demotion threshold is calculated based on the minimum load score. The demotion threshold is a product of the minimum load score and a demotion range factor.

A demotion set is then determined that is made up of units of storage allocated to the storage group from the high performance disk group that have load scores that are less than or equal to the demotion threshold. The host data stored on the units of storage in the demotion set is then migrated to units of storage allocated from a lower performance disk group, and the units of storage in the demotion set are deallocated, such that they are available to be allocated from the high performance disk group to another one of the storage groups.

Embodiments of the disclosed techniques may provide significant advantages over previous approaches. For example, by proactively releasing high performance storage resources when a storage group is exceeding its service level objective, the disclosed techniques effectively deallocate previously allocated high performance storage when the storage group has resumed meeting its service level objective. The disclosed techniques for proactive release of high performance storage resources avoid situations in which storage is allocated from a high performance disk group without subsequent deallocation, and help maintain the availability of high speed storage for allocation from the high performance disk group as the needs of different storage groups change. In addition, the disclosed techniques specifically address the situation in which host data access patterns change, resulting in specific data within the storage group that was formerly "hot" becoming "cold", and allow for the "cold" data to be identified and migrated from storage previously allocated from a high performance disk group to lower cost storage allocated from a lower performance disk group, thus reducing overall data storage costs. And the use of the disclosed safety margin prevents a storage group from oscillating between the states of missing and exceeding its service level objective.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the invention hereof is broader than the specific example embodiments disclosed.

The techniques for proactively releasing high performance storage resources described herein include allocating units of storage to one or more storage groups from multiple physical disk groups, where each of the storage groups has an associated service level objective, and where the physical disk groups include a high performance disk group, and at least one lower performance disk group. A load score is calculated for each unit of storage allocated to a storage group from the high performance disk group, and a minimum load score is determined that is the lowest load score among the load scores calculated for the units of storage allocated from the high performance disk group to the storage group. When the service level objective associated with the storage group is being exceeded, a demotion threshold is calculated that is a product of the minimum load score and a demotion range factor. The disclosed techniques determine a demotion set that is made up of units of storage allocated to the storage group from the high performance disk group that have load scores that are less than or equal to the demotion threshold. The host data stored on the units of storage in the demotion set is migrated to units of storage allocated from the lower performance disk group, and the units of storage in the demotion set are deallocated for subsequent re-allocation from the high performance disk group, e.g. to another storage group.

Figure 1:
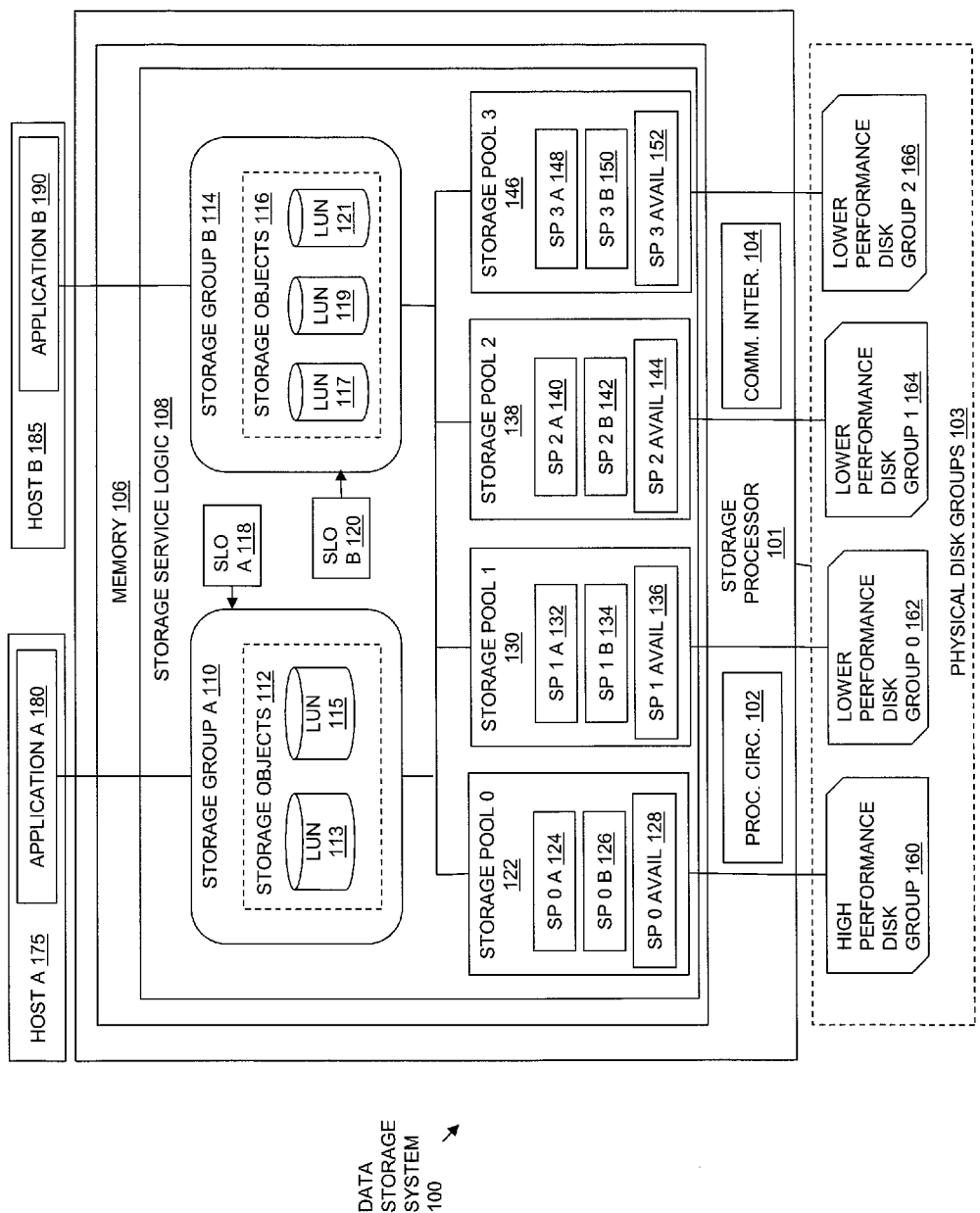
FIG. 1 is a block diagram of an operational example of a data storage environment including components of an embodiment of the disclosed techniques.

FIG. 1 is a block diagram showing an example of a data storage environment including components of an embodiment of the disclosed techniques. As shown in FIG. 1, multiple host computing devices, shown as Host A 175 and Host B 185, include host applications executing thereon, e.g. Application A 180 executing on Host A 175 and Application B 190 executing on Host B 185. Host A 175 and Host B 185 access data storage provided by Data Storage System 100, for example over one or more computer networks, such as a local area network (LAN), and/or a wide area network (WAN) such as the Internet, etc. Data Storage System 100 includes a Storage Processor 101 and Physical Disk Groups 103. The Data Storage System 100 may include one or more storage processors such as Storage Processor 101. Storage Processor 101 may be provided as a circuit board assembly, or "blade," which plugs into a chassis that encloses and cools multiple storage processors, and that has a backplane for interconnecting storage processors. However, no particular hardware configuration is required, and Storage Processor 101 may be embodied as any specific type of computing device capable of processing host input/output (I/O) operations (e.g. I/O reads and I/O writes).

Physical Disk Groups 103 may be directly physically connected to Storage Processor 101, or may be communicably connected to Storage Processor 101 by way of one or more computer networks, e.g. including or consisting of a Storage Area Network (SAN) or the like. Physical Disk Groups 103 organize non-volatile storage devices by the level of performance they provide, in terms of response time. High Performance Disk Group 160 is made up of some number of high performance non-volatile storage devices. For example, High Performance Disk Group 160 may consist of one or more solid state drives, such as enterprise flash drives. In one embodiment, High Performance Disk Group 160 is made up of enterprise multi-level cell (eMLC) flash memory.

The lower performance disk groups shown by Lower Performance Disk Group 0 162, Lower Performance Disk Group 1 164, and Lower Performance Disk Group 2 166, are each made up of non-volatile storage devices that have lower performance than the non-volatile storage devices in High Performance Disk Group 160. For example, the non-volatile storage devices Lower Performance Disk Group 0 162, Lower Performance Disk Group 1 164, and Lower Performance Disk Group 2 166 may consist of a number of magnetic hard disk drives. Because the response time provided by magnetic hard disk drives is higher than the response time provided by the enterprise flash drives of High Performance Disk Group 160, the storage provided by each of Lower Performance Disk Group 0 162, Lower Performance Disk Group 1 164, and Lower Performance Disk Group 2 166 is lower performance than the storage provided by High Performance Disk Group 160. At the same time, since magnetic hard disk drives are less costly than solid state drives such as enterprise flash drives, the storage provided by Lower Performance Disk Group 0 162, Lower Performance Disk Group 1 164, and Lower Performance Disk Group 2 166 is less costly than the storage provided by High Performance Disk Group 160.

Each of Lower Performance Disk Group 0 162, Lower Performance Disk Group 1 164, and Lower Performance Disk Group 2 166 may contain non-volatile storage having a different level of performance. For example, Lower Performance Disk Group 0 162 may consist of hard disk drives having a disk rotational speed of fifteen thousand revolutions per minute (RPM), Lower Performance Disk Group 1 164 may consist of hard disk drives having a disk rotational speed of ten thousand revolutions per minute, and Lower Performance Disk Group 2 166 may consist of hard disk drives having a disk rotational speed of seven thousand two hundred revolutions per minute. Thus Lower Performance Disk Group 0 162 may be made up of higher performance non-volatile storage devices than Lower Performance Disk Group 1 164, and Lower Performance Disk Group 1 164 may be made up of higher performance non-volatile storage devices than Lower Performance Disk Group 2 166.

Storage Processor 101 includes one or more Communication Interfaces 104, Processing Circuitry 102, and Memory 106. Communication Interfaces 104 enable Storage Processor 101 to communicate with Host A 175, Host B 185, and Physical Disk Groups 103 over one or more computer networks, and may include, for example, SCSI and/or other network interface adapters for converting electronic and/or optical signals received over one or more networks into electronic form for use by the Storage Processor 101. The Processing Circuitry 102 may, for example, include or consist of one or more microprocessors, e.g. central processing units (CPUs), multi-core processors, chips, and/or assemblies, and associated circuitry. Memory 106 may include volatile memory (e.g., RAM), and/or non-volatile memory, such as one or more ROMs, disk drives, solid state drives, and the like. Processing Circuitry 102 and Memory 108 together form control circuitry, which is constructed and arranged to carry out various methods and functions as described herein. The Memory 108 stores a variety of software components that may be provided in the form of executable program code. For example, as shown in FIG. 1, Memory 108 may include software components such as Storage Service Logic 108. When the program code is executed by Processing Circuitry 102, Processing Circuitry 102 is caused to carry out the operations of the software components. Although certain software components are shown and described for purposes of illustration and explanation, those skilled in the art will recognize that Memory 108 may include various other software components, such as an operating system, and various other applications, processes, etc.

During operation of the components shown in FIG. 1, Storage Service Logic 108 provides data storage for use by one or more applications to data. In the example of FIG. 1, Storage Service Logic 108 provides Storage Objects 112 in Storage Group A 110 to store data that is generated and/or used by Application A 180. The Storage Objects 112 in Storage Group A 110 may, for example, include some number of logical disks (LUNs), shown by LUN 113 and LUN 115. Storage Service Logic 108 also provides Storage Objects 116 in Storage Group B 114 to store data that is generated and/or used by Application B 190. The Storage Objects 116 in Storage Group B 114 may, for example, also include some number of logical disks, shown by LUN 117, LUN 119 and LUN 121. Storage Objects 112 and Storage Objects 116 provided by Storage Service Logic 108 using units of storage allocated from the Physical Disk Groups 103.

Those skilled in the art will recognize that while the storage objects in the example of FIG. 1 are shown for purposes of illustration and explanation as LUNs, the disclosed techniques are not limited to use with LUNs. Alternatively, or in addition, the disclosed techniques may be applied to other types of storage objects that may be provided by the Storage Processor 101 to store data on behalf of one or more applications, such as host file systems, and/or VVols (virtual volumes, such as a virtual machine disk, e.g., as available from VMware, Inc. of Palo Alto, Calif.).

Storage Group A 110 and Storage Group B 114 each have an associated service level objective (SLO) that indicates a target average response time for I/O operations performed on the storage objects within the storage group. Specifically, Storage Group A 110 is associated with SLO A 118, and SLO A 118 indicates a target average response time for I/O operations performed by Application A 180 on Storage Objects 112. Storage Group B 114 is associated with SLO B 120, and SLO B 120 indicates a target average response time for I/O operations performed by Application B 190 on Storage Objects 116.

Storage Service Logic 108 monitors the I/O operations performed by Application A 180 on Storage Objects 112, and detects that Storage Group A 110 is missing its service level objective when the average response time for the I/O operations performed by Application A 180 on Storage Objects 112 is greater than the target average response time indicated by SLO A 118. In response to detecting that Storage Group A 110 is missing its service level objective, Storage Service Logic 108 identifies host data in Storage Objects 112 that is frequently accessed by Application A 180, and that is not stored in units of storage allocated from High Performance Disk Group 160 (i.e. is stored in units of storage allocated from Lower Performance Disk Group 162, Lower Performance Disk Group 164, or Lower Performance Disk Group 166). Storage Service Logic 108 then allocates units of storage from High Performance Disk Group 160 to the Storage Objects 112, and migrates the frequently accessed data to those newly allocated units of high performance storage. In this way, Storage Service Logic 108 operates to allocate storage resources from High Performance Disk Group 160 to Storage Objects 112 to store frequently accessed host data, thus reducing the average response time for I/O operations by Application A 180 on Storage Objects 112, in order to cause the Storage Group A 110 to meet its service level objective SLO A 118.

Similarly, Storage Service Logic 108 monitors the average response time for I/O operations performed by Application B 190 on Storage Objects 116, and detects that Storage Group A 110 is missing its service level objective when that average response time is greater than the target average response time indicated by SLO B 120. When Storage Service Logic 108 detects that Storage Group A 110 is missing its service level objective, Storage Service Logic 108 identifies host data stored in Storage Objects 116 that is frequently accessed by Application B 190, and that is not stored in units of storage allocated from High Performance Disk Group 160 (i.e. is stored in units of storage allocated from Lower Performance Disk Group 162, Lower Performance Disk Group 164, or Lower Performance Disk Group 166). Storage Service Logic 108 then allocates units of storage from High Performance Disk Group 160 to the Storage Objects 116, and migrates the frequently accessed data to those newly allocated units of high performance storage. In this way, Storage Service Logic 108 operates to allocate storage resources from High Performance Disk Group 160 to Storage Objects 116 to store frequently accessed host data, thus reducing the average response time for I/O operations by Application B 190 on Storage Objects 116, in order to cause the Storage Group B 114 to meet its service level objective SLO B 120.

Further during operation of the embodiment shown in FIG. 1, Storage Service Logic 108 uses Storage Pool 0 122, Storage Pool 1 130, Storage Pool 2 138, and Storage Pool 3 146 to allocate storage resources from the Physical Disk Groups 103 to the storage objects 112 in Storage Group A 110 and to the Storage Objects 116 in Storage Group B 114, such that the service level objectives SLO A 118 and SLO B 120 are met. For example, the units of storage provided from the Physical Disk Groups 103 by each one of the storage pools may be units of storage that are generally referred to as extents, and which are allocated from respective ones of the Physical Disk Groups 103 through the corresponding storage pools to Storage Objects 112 or Storage Objects 116.

The extents provided as units of storage to Storage Objects 112 and/or Storage Objects 116 from storage pools 122, 130, 138 and 146 may be various specific increments of storage space, e.g. 128 MB, 256 MB, 1 GB in size.

Each storage pool includes indications of the organization and/or amounts or sizes of the allocated and unallocated units of storage managed by the storage pool, as well as indications (e.g. locations) of units of storage in the non-volatile storage devices in the respective physical disk group that are currently allocated to storing host data in specific storage objects, and/or that are free and currently unallocated but available for allocation. In the example of FIG. 1, Storage Pool 0 122 includes indications of the units of storage allocated from High Performance Disk Group 160 to Storage Objects 112 in Storage Group A 110, shown by SP 0 A 124, indications of the units of storage allocated from High Performance Disk Group 160 to Storage Objects 116 in Storage Group B 114, shown by SP 0 B 126, and indications of units of storage in High Performance Disk Group 160 that are available for allocation to either Storage Objects 112 in Storage Group A 110 or Storage Objects 116 in Storage Group B 114, shown by SP 0 AVAIL 128.

Storage Pool 1 130 includes indications of units of storage allocated from Lower Performance Disk Group 0 162 to Storage Objects 112 in Storage Group A 110, shown by SP 1 A 132, indications of units of storage allocated from Lower Performance Disk Group 0 162 to Storage Objects 116 in Storage Group B 114, shown by SP 1 B 134, and indications of units of storage in Lower Performance Disk Group 0 162 that are available for allocation to either Storage Objects 112 in Storage Group A 110 or Storage Objects 116 in Storage Group B 114, shown by SP 1 AVAIL 136.

Storage Pool 2 138 includes indications of units of storage allocated from Lower Performance Disk Group 1 164 to Storage Objects 112 in Storage Group A 110, shown by SP 2 A 140, indications of units of storage allocated from Lower Performance Disk Group 1 164 to Storage Objects 116 in Storage Group B 114, shown by SP 2 B 142, and indications of units of storage in Lower Performance Disk Group 1 164 that are available for allocation to either Storage Objects 112 in Storage Group A 110 or Storage Objects 116 in Storage Group B 114, shown by SP 2 AVAIL 144.

Storage Pool 3 146 includes indications of units of storage allocated from Lower Performance Disk Group 2 166 to Storage Objects 112 in Storage Group A 110, shown by SP 3 A 148, indications of units of storage allocated from Lower Performance Disk Group 2 166 to Storage Objects 116 in Storage Group B 114, shown by SP 3 B 150, and indications of units of storage in Lower Performance Disk Group 2 166 that are available for allocation to either Storage Objects 112 in Storage Group A 110 or Storage Objects 116 in Storage Group B 114, shown by SP 3 AVAIL 150.

Further during operation of the embodiment shown in FIG. 1, in order to proactively release high performance data storage allocated to Storage Group A 110 from High Performance Disk Group 160, Storage Service Logic 108 calculates a load score for each unit of storage allocated to one of the Storage Objects 112 in Storage Group A 110 that was allocated from the High Performance Disk Group 160. The units of storage allocated from High Performance Disk Group 160 to Storage Objects 112 are indicated by SP 0 A 124 in Storage Pool 0 122. For example, a load score may be calculated for each unit of storage indicated by SP 0 A 124 that is equal to an average number of I/O operations per second (IOPS) performed on the unit of storage over a preceding time period (e.g. 24 hours). In one embodiment, Storage Service Logic 108 calculates a load score for each unit of storage allocated from High Performance Disk Group 160 to Storage Objects 112 in Storage Group A 110 that is equal to the sum of the exponential moving average IOPS for that storage unit over two preceding time periods (e.g. over the preceding 24 hours and over the preceding 5 days):

load score=EMA(24 hrs,IOPS)+EMA(5 days,IOPS)

The Storage Service Logic 108 also determines a minimum load score for the units of storage allocated from High Performance Disk Group 160 to Storage Objects 112 in Storage Group A 110 that is the lowest load score among the load scores calculated for those units of storage.

As mentioned above, Storage Service Logic 108 monitors the average response time for I/O operations performed on the each of the storage groups, by monitoring the I/O operations performed on Storage Objects 112 in Storage Group A 110, and by monitoring the I/O operations performed on Storage Objects 116 in Storage Group B 114. In one embodiment, Storage Service Logic 108 periodically (e.g. every 24 hours) calculates the average response time for I/O operations performed on a given storage group during a preceding time period as a sum of the response times of each physical disk group, where each of the response times is weighted by the number of I/O operations performed per second during the preceding time period on storage units allocated to the storage group from that physical disk group. For example, an average response time for Storage Group A 110 (e.g. Storage_Group_A_MS) during a preceding time period may be calculated as the following sum:

Storage_Group_A_MS=
(SP_0_A_Storage_Units_IOPS*High_Performance_DG_MS)+
(SP_1_A_Storage_Units_IOPS*Lower_Performance_DG_0_MS)+
(SP_2_A_Storage_Units_IOPS*Lower_Performance_DG_1_MS)+
(SP_3_A_Storage_Units_IOPS*Lower_Performance_DG_2_MS)

where

SP_0_A_Storage_Units_IOPS is the IOPS over the preceding time period for storage units allocated to Storage Objects 112 from High Performance Disk Group 160, High_Performance_DG_MS is the response time for the non-volatile storage devices contained in High Performance Disk Group 160, SP_1_A_Storage_Units_IOPS is the IOPS over the preceding time period for storage units allocated to Storage Objects 112 from Lower Performance Disk Group 0 162, Lower_Performance_DG_0_MS is the response time for the non-volatile storage devices contained in Lower Performance Disk Group 0 162, SP_2_A_Storage_Units_IOPS is the IOPS over the preceding time period for storage units allocated to Storage Objects 112 from Lower Performance Disk Group 1 164, Lower_Performance_DG_1_MS is the response time for the non-volatile storage devices contained in Lower Performance Disk Group 1 164, SP_3_A_Storage_Units_IOPS is the IOPS over the preceding time period for storage units allocated to Storage Objects 112 from Lower Performance Disk Group 2 166, and Lower_Performance_DG_2_MS is the response time for the non-volatile storage devices contained in Lower Performance Disk Group 2 166.

As part of determining whether Storage Group A 110 is exceeding its service level objective (SLO A 118), a safety margin for Storage Group A 110 (Storage_Group_A_Safety_Margin) may be calculated by Storage Service Logic 108. In one embodiment, the safety margin for Storage Group A 110 is equal to the sum of the IOPS for all storage units allocated to Storage Objects 112, multiplied by the difference between the service level objective for Storage Group A 110 (i.e. SLO A 118 (SLO_A)) and the average response time over the preceding time period for Storage Group A 110 (Storage_Group_A_MS):

Storage_Group_A_Safety_Margin=
(SP_0_A_Storage_Units_IOPS+
SP_1_A_Storage_Units_IOPS+
SP_2_A_Storage_Units_IOPS+
SP_3_A_Storage_Units_IOPS)*(SLO_A−
Storage_Group_A_MS)

As part of determining whether the Storage Group A 110 is exceeding its service level objective SLO A 118, Storage Service Logic 108 may determine whether the average response time for Storage Group A 110 (e.g. Storage_Group_A_MS) over the preceding time period is less than SLO A 118 minus the current safety margin for Storage Group A 110. In other words, in one embodiment, Storage Service Logic 108 detects that the average response time for Storage Group A 110 over the preceding time period exceeds SLO A 118 only if the following is true:

Storage_Group_A_MS<(SLO_A−Storage_Group_A_Safety_Margin)

A similarly calculated safety margin may be used when determining whether additional high performance resources are to be allocated to a storage group, such that a storage group is only considered to be missing its service level objective when the average response time for the storage group is greater than the service level objective for the storage group plus the current safety margin for the storage group.

By using the above described safety margin, and only determining that a storage group is exceeding its service level objective when the average response time for the storage group during the preceding time period is less than the service level objective for the storage group by an amount that is greater than the current safety margin for the storage group, and only determining that a storage group is missing its service level objective when the average response time for the storage group is greater than the service level objective for the storage group by an amount that is greater the current safety margin for the storage group, the disclosed system provides a mechanism for preventing the deallocation of high performance data storage resources from a storage group under circumstances in which deallocating high performance data storage resources from the storage group would likely cause the storage group to begin missing its service level objective, and also for preventing the allocation of additional high performance data storage resources to a storage group under circumstances in which allocating additional high performance data storage resources to the storage group would likely cause the storage group to begin exceeding its service level objective. In this way, embodiments of the disclosed system may advantageously prevent a storage group from oscillating between the states of missing and exceeding its service level objective.

In response to detecting that the service level objective SLO A 118 for Storage Group A 110 is being exceeded, Storage Service Logic 108 calculates a demotion threshold for the units of storage allocated to Storage Objects 112 in Storage Group A 110 from High Performance Disk Group 160 based on the minimum load score for the units of storage allocated to Storage Objects 112 in Storage Group A 110 from High Performance Disk Group 160. The demotion threshold for the units of storage allocated to Storage Objects 112 in Storage Group A 110 from High Performance Disk Group 160 is a product of the minimum load score for the units of storage allocated to Storage Objects 112 in Storage Group A 110 from High Performance Disk Group 160 and a predetermined or configurable demotion range factor. For example, in the case where the minimum load score for the units of storage allocated to Storage Objects 112 in Storage Group A 110 from High Performance Disk Group 160 is 2500 IOPS, and the demotion range factor is configured to be 150%, the demotion threshold may be calculated as follows:

2500*150%=3750

Further in response to detecting that the service level objective SLO A 118 for Storage Group A 110 is being exceeded, the Storage Service Logic 108 uses the demotion threshold to determine a demotion set of units of storage within the units of storage allocated to Storage Objects 112 in Storage Group A 110 from High Performance Disk Group 160. The demotion set consists of those units of storage within the units of storage allocated to Storage Objects 112 in Storage Group A 110 from High Performance Disk Group 160 that have that have load scores that are less than or equal to the demotion threshold. For example, in the case where the demotion threshold equals 3750 IOPS, the demotion set would consist of all units of storage within the units of storage allocated to Storage Objects 112 in Storage Group A 110 that have load scores that are less than or equal to 3750 IOPS.

Further in response to detecting that the service level objective SLO A 118 for Storage Group A 110 is being exceeded, Storage Service Logic 106 operates to migrate the host data stored by Application A 180 in the units of storage in the demotion set to units of storage allocated from a lower performance disk group. For example, in the case where additional units of storage need to be allocated from a lower performance disk group to Storage Objects 110 in Storage Group A 110 to store the host migrated from the units of storage in the demotion set, Storage Service Logic 108 may operate to allocate those addition units of storage from one or more of Lower Performance Disk Group 0 162, Lower Performance Disk Group 1 164, or Lower Performance Disk Group 2 166 through their respective storage pools.

After the host data has been migrated from the units of storage in the demotion set, the units of storage may be deallocated for subsequent allocation, e.g. to Storage Objects 116 in Storage Group B 144, or again back to Storage Objects 112 in Storage Group A 110 in response to changes in the patterns of I/O operations performed by Application B 190 and/or Application A 180, in order to meet SLO B 120 and SLO A 118. For example, the units of storage in the demotion set may be deallocated by moving indications of the units of storage in the demotion set from SP 0 A 124 to SP 0 AVAIL 128 in Storage Pool 0 122, since SP 0 AVAIL 128 stores indications of units of storage in High Performance Disk Group 160 that are available for allocation to either Storage Objects 112 in Storage Group A 110 or Storage Objects 116 in Storage Group B 114.

While the above describes a system and process for determining a demotion set from within the units of storage allocated to Storage Objects 112 in Storage Group A 110 from High Performance Disk Group 160, embodiments of the disclosed techniques may also determine a demotion set as described above within the units of storage allocated to Storage Objects 112 in Storage Group A 110 from other ones of the Physical Disk Groups 103. For example, in one embodiment, in response to determining that Storage Group A 110 is exceeding SLO A 118, Storage Service Logic 108 may operate to determine a demotion set from within the units of storage allocated to Storage Objects 112 in Storage Group A 110 from other ones of the Physical Disk Groups 103 that a) are not the lowest performance disk group (e.g. are not Lower Performance Disk Group 126), and b) are made up of non-volatile storage devices having response times that are below SLO A 118.

For example, in the case where the non-volatile storage devices in Lower Performance Disk Group 0 162 have a response time below SLO A 118, Storage Service Logic 108 may, in response to determining that Storage Group A 110 is exceeding SLO A 118, operate to determine a demotion set from within the units of storage allocated to Storage Objects 112 in Storage Group A 110 from Lower Performance Disk Group 0 162, migrate the data stored on the units of storage in that demotion set to units of storage allocated from Lower Performance Disk Group 1 154, and then deallocate the units of storage from that demotion set for subsequent reallocation, e.g. by storing indications of those units of storage from that demotion set into SP 1 AVAIL 136.

In addition, while the above description is with regard to a single storage group provided by Data Storage System 100, the disclosed system may perform the same process with regard to each one of multiple storage groups provided by Data Storage System 100.

Figure 2:
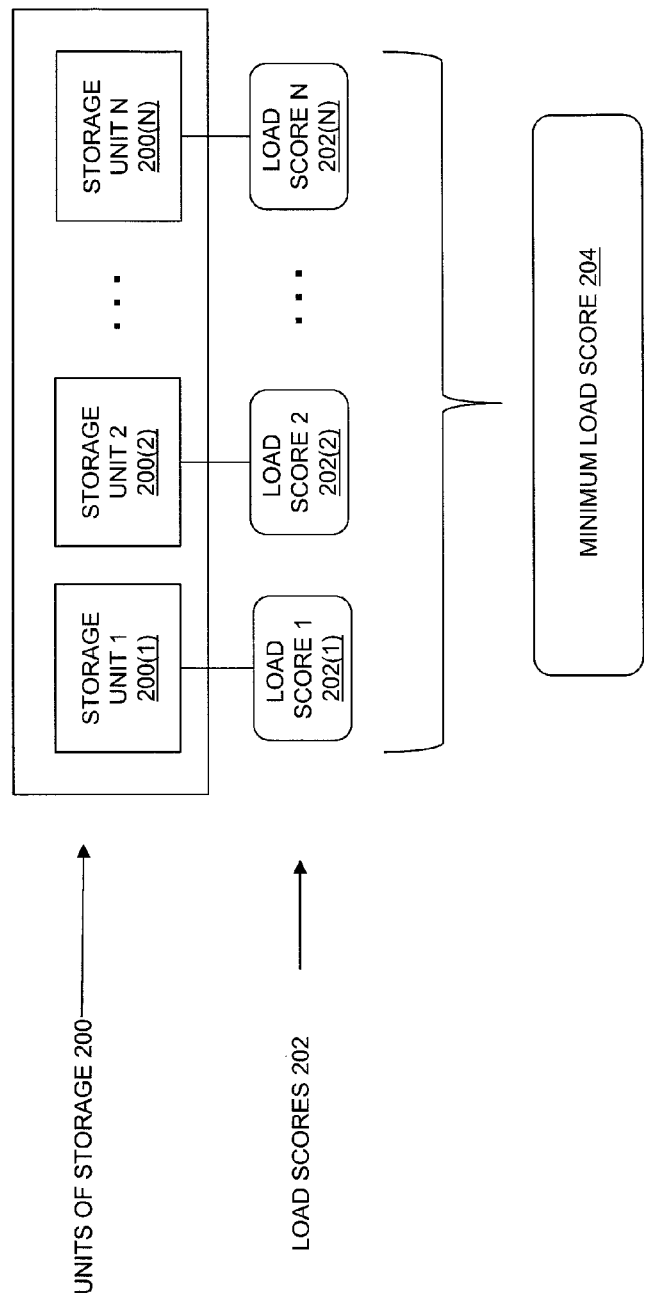
FIG. 2 is a block diagram showing load scores maintained for storage units allocated from a disk group.

FIG. 2 is a block diagram in which Units of Storage 200 represent the units of storage allocated from a physical disk group to a storage group that contains a number of storage objects. As shown in FIG. 2, the disclosed system calculates Load Scores 202 for Units of Storage 200, such that each one of the Units of Storage 200 has a corresponding one of Load Scores 202. Specifically, the disclosed system calculates Load Score 1 202(1) for Storage Unit 1 200(1), Load Score 2 202(2) for Storage Unit 2 200(2), and so on through calculating Load Score N 202(N) for Storage Unit N 200(N). As also shown in FIG. 2, the disclosed system operates to determine a Minimum Load Score 204 that is the lowest load score within Load Scores 202. Calculation of the Load Scores 200 and Minimum Load Score 204 may, for example, be performed periodically, e.g. every 24 hours.

Figure 3:
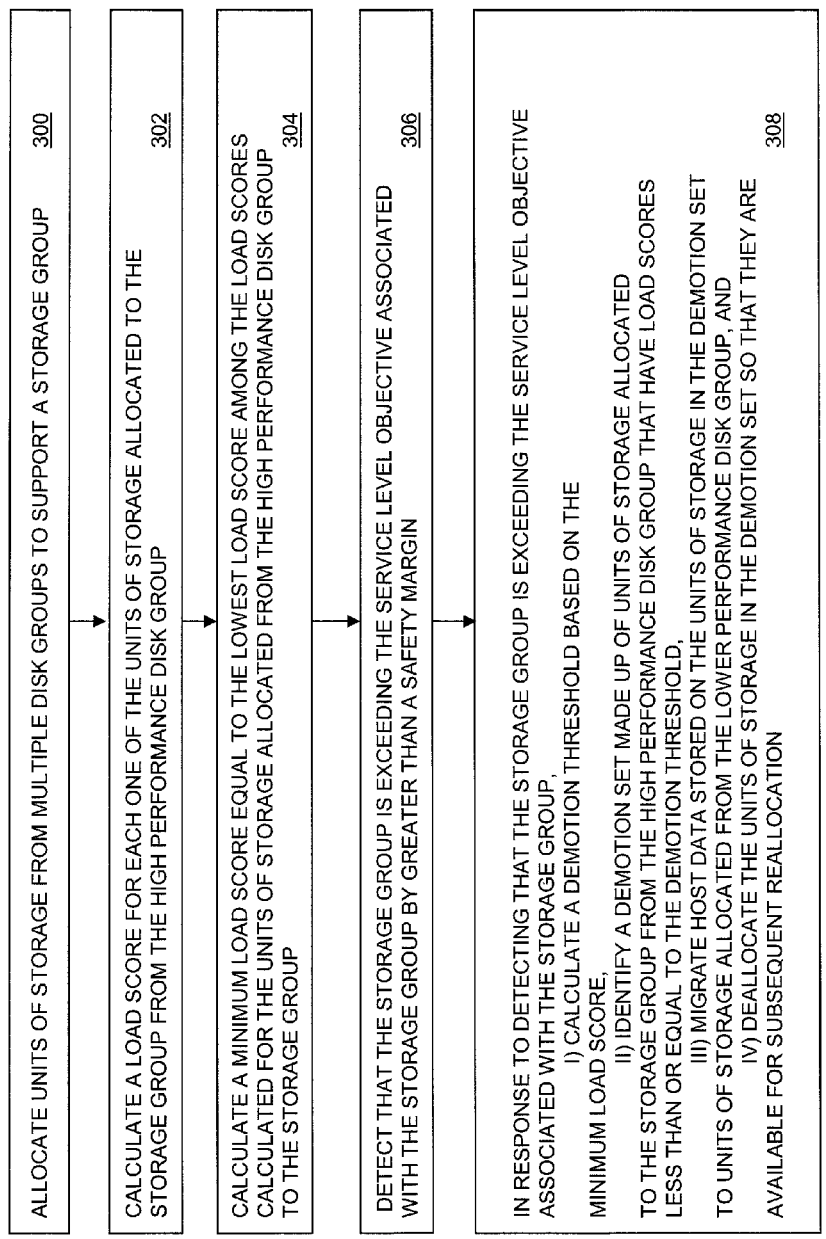
FIG. 3 is a flow chart showing steps performed by an embodiment of the disclosed system.

FIG. 3 is a flow chart showing steps performed by an embodiment of the disclosed system. The steps of FIG. 3 may, for example, be performed by Storage Service Logic 108. At step 300, units of storage (e.g. extents) are allocated from multiple disk groups to support the storage objects within a storage group. At step 302, a load score is maintained for each one of the units of storage allocated to the storage group from the high performance disk group. At step 304, a minimum load score is calculated that is equal to the lowest load score among the load scores calculated for the units of storage allocated to the storage group from the high performance disk group. At step 306, the disclosed system detects that the storage group is exceeding the service level objective associated with the storage group. At step 308, in response to detecting that the storage group is exceeding the service level objective associated with the storage group, the disclosed system i) calculates a demotion threshold based on the minimum load score, ii) identifies a demotion set made up of units of storage allocated to the storage group from the high performance disk group that have load scores less than or equal to the demotion threshold, iii) migrates host data stored on the units of storage in the demotion set to units of storage allocated from the lower performance disk group, and iv) deallocates the units of storage in the demotion set so that they are available for subsequent reallocation.

While the steps of FIG. 3 are described with reference to units of storage allocated from a high performance disk group, they may also be applied to units of storage allocated from one or more lower performance disk groups. In addition, the steps of FIG. 3 may be performed iteratively, e.g. once per 24 hours.

Figure 4:
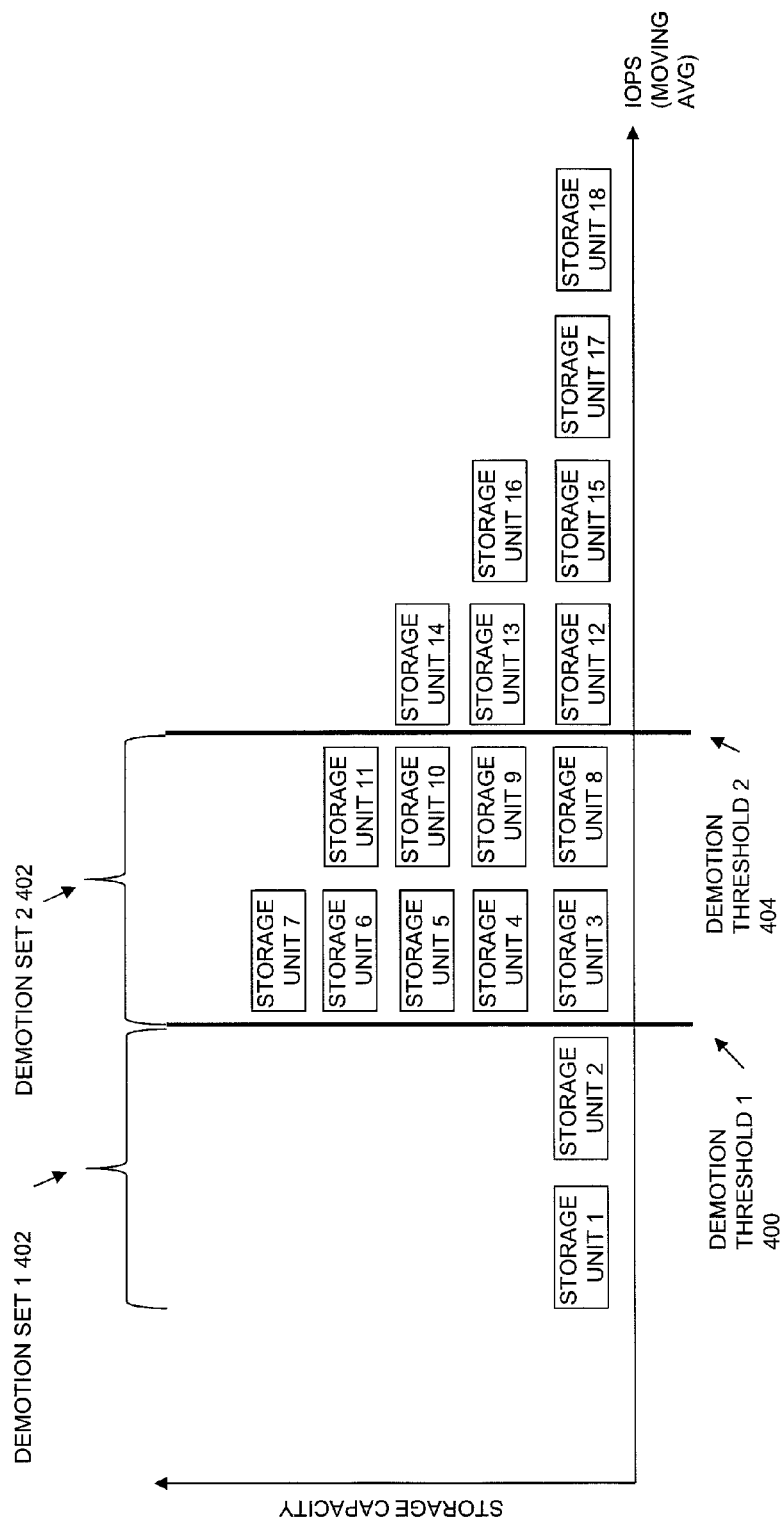
FIG. 4 is a chart illustrating how performing the disclosed techniques iteratively on units of storage allocated to a storage group from a disk group may proactively identify units of storage to be released and made available for subsequent reallocation in response to detecting that the storage group is exceeding its service level objective.

FIG. 4 is a chart illustrating how performing the disclosed techniques iteratively (e.g. once every 24 hours) on units of storage allocated to a storage group from a high performance disk group proactively identifies units of storage to be released and made available for subsequent reallocation in response to detecting that the storage group is exceeding its service level objective. As shown in FIG. 4, at a first point in time the disclosed system determines whether the storage group is exceeding its service level objective, and in response to detecting that the storage group is exceeding its service level objective, calculates a first demotion threshold, shown as Demotion Threshold 1 400. A first demotion set is identified using Demotion Threshold 1 400, shown by Demotion Set 1 402. The units of storage in Demotion Set 1 402 are those of the units of storage that have load scores less than or equal to Demotion Threshold 1 400, i.e. Storage Unit 1 and Storage Unit 2. The host data stored on Storage Unit 1 and Storage Unit 2 is migrated to other units of storage allocated from lower performance physical disk groups, and Storage Unit 1 and Storage Unit 2 are deallocated.

After a period of time, e.g. after a first 24 hours, the disclosed system determines whether the storage group is still exceeding its service level objective. In response to detecting that the storage group is still exceeding its service level objective, the disclosed system then determines a second demotion threshold, shown by Demotion Threshold 2 404. A second demotion set, shown by Demotion Set 2 402, is then identified using Demotion Threshold 2 404. Demotion Set 2 402 consists of those units of storage having load scores that are less than or equal to Demotion Threshold 2 404. Since Storage Unit 1 and Storage Unit 2 were previously deallocated, the units of storage in Demotion Set 2 402 are shown as Storage Unit 3, Storage Unit 4, Storage Unit 5, Storage Unit 6, Storage Unit 7, Storage Unit 8, Storage Unit 9, Storage Unit 10, and Storage Unit 11. The host data stored on the units of storage in Demotion Set 2 402 is migrated to other units of storage allocated from lower performance physical disk groups, and the units of storage in Demotion Set 2 402 are then deallocated.

The process may continue iteratively, determining a new demotion set after each period of time, until the storage group is no longer exceeding its service level objective.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. For example, it should be understood that some data storage systems may be configured to run host applications such as Application A 180 and Application B 190 locally, i.e., in the memory 106 of the Storage Processor 101.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of proactively releasing high performance storage resources, comprising:
    allocating, by a storage processor in a data storage system, units of storage from multiple physical disk groups to one or more storage objects in a storage group, wherein the storage objects are used by at least one application to store host data, wherein the multiple physical disk groups include a high performance disk group made up of one or more high performance disk drives and at least one lower performance disk group made up of one or more lower performance disk drives, wherein the storage group is associated with a service level objective, and wherein the service level objective comprises an average response time target for I/O operations performed on the storage objects in the storage group;
    calculating a load score for each one of the units of storage allocated to the storage group from the high performance disk group;
    determining a minimum load score equal to the lowest load score among the load scores calculated for the units of storage allocated from the high performance disk group to the storage group;
    detecting that an average response time for the storage group is exceeding the service level objective associated with the storage group; and
    in response to detecting that the average response time for the storage group is exceeding the service level objective associated with the storage group,
        calculating a demotion threshold based on the minimum load score, wherein the demotion threshold is a product of multiplying the minimum load score and a demotion range factor,
        identifying a demotion set made up of units of storage allocated to the storage group from the high performance disk group that have load scores that are less than or equal to the demotion threshold,
        migrating host data stored on the units of storage in the demotion set to units of storage allocated from the lower performance disk group, and
        deallocating, by the storage processor, the units of storage in the demotion set so that they are available for subsequent reallocation by the storage processor to store host data subsequently received by the storage processor.

2. The method of claim 1, wherein detecting that the average response time for the storage group is exceeding the service level objective associated with the storage group includes calculating an average response time for the storage group during a preceding time period equal to a sum of the response times of the physical disk groups, wherein the response time of each physical disk group is weighted by the number of I/O operations performed per second during the preceding time period on storage units allocated to the storage group from that physical disk group.

3. The method of claim 2, wherein detecting that the average response time for the storage group is exceeding the service level objective associated with the storage group further includes calculating a safety margin for the storage group that is equal to the product of multiplying i) the I/O operations performed per second on all storage units allocated to the storage group, by ii) a difference between the service level objective associated with the storage object and the average response time for the storage group during the preceding time period.

4. The method of claim 3, wherein detecting that the average response time for the storage group is exceeding the service level objective associated with the storage group detects that the average response time for the storage group is exceeding the service level objective associated with the storage group only in response to the average response time for the storage group during a preceding time period being less than the service level objective associated with the storage group minus the safety margin for the storage group.

5. The method of claim 4, wherein the high performance disk drives in the high performance disk group consist of at least one solid state drive; and
wherein the lower performance disk drives in the lower performance disk group consist of at least one magnetic hard disk drive.

6. The method of claim 5, wherein migrating the host data stored on the units of storage in the demotion set to units of storage allocated from the lower performance disk group includes allocating units of storage from the lower performance disk group to store the host data stored on the units of storage in the demotion set.

7. The method of claim 6, wherein the storage objects in the storage group comprise logical disks (LUNS) that are used by the application to store host data, and further comprising:
after deallocating the units of storage in the demotion set, allocating the units of storage in the demotion set to a storage object contained in another storage group in response to detecting that the other storage group is missing a service level objective associated with that storage group, wherein the storage object contained in the other storage group is a logical disk (LUN).

8. The method of claim 1, wherein the storage objects in the storage group comprise virtual volumes that are used by the application to store host data.

9. The method of claim 1, wherein the storage objects in the storage group comprise host file systems that are used by the application to store host data.

10. A computerized apparatus, comprising:
processing circuitry in a storage processor of a data storage system;
a memory coupled to the processing circuitry, the memory storing program code for proactively releasing high performance storage resources which, when executed by the processing circuitry, causes the processing circuitry to:
allocate units of storage from multiple physical disk groups to one or more storage objects in a storage group, wherein the storage objects are used by at least one application to store host data, wherein the multiple physical disk groups include a high performance disk group made up of one or more high performance disk drives and at least one lower performance disk group made up of one or more lower performance disk drives, wherein the storage group is associated with a service level objective, and wherein the service level objective comprises an average response time target for I/O operations performed on the storage objects in the storage group;
calculate a load score for each one of the units of storage allocated to the storage group from the high performance disk group;
determine a minimum load score equal to the lowest load score among the load scores calculated for the units of storage allocated from the high performance disk group to the storage group;
detect that an average response time for the storage group is exceeding the service level objective associated with the storage group; and
in response to detecting that the average response time for the storage group is exceeding the service level objective associated with the storage group,
calculate a demotion threshold based on the minimum load score, wherein the demotion threshold is a product of multiplying the minimum load score and a demotion range factor,
identify a demotion set made up of units of storage allocated to the storage group from the high performance disk group that have load scores that are less than or equal to the demotion threshold,
migrate host data stored on the units of storage in the demotion set to units of storage allocated from the lower performance disk group, and
deallocate the units of storage in the demotion set so that they are available for subsequent reallocation by the storage processor to store host data subsequently received by the storage processor.

11. The computerized apparatus of claim 10, wherein the program code, when executed by the processing circuitry, further causes the processing circuitry to detect that the average response time for the storage group is exceeding the service level objective associated with the storage group in part by calculating an average response time for the storage group during a preceding time period equal to a sum of the response times of the physical disk groups, wherein the response time of each physical disk group is weighted by the number of I/O operations performed per second during the preceding time period on storage units allocated to the storage group from that physical disk group.

12. The computerized apparatus of claim 11, wherein the program code, when executed by the processing circuitry, further causes the processing circuitry to detect that the average response time for the storage group is exceeding the service level objective associated with the storage group at least in part by calculating a safety margin for the storage group that is equal to the product of multiplying i) the I/O operations performed per second on all storage units allocated to the storage group, by ii) a difference between the service level objective associated with the storage object and the average response time for the storage group during the preceding time period.

13. The computerized apparatus of claim 12, wherein the program code, when executed by the processing circuitry, further causes the processing circuitry to detect that the average response time for the storage group is exceeding the service level objective associated with the storage group by detecting that the average response time for the storage group is exceeding the service level objective associated with the storage group only in response to the average response time for the storage group during a preceding time period being less than the service level objective associated with the storage group minus the safety margin for the storage group.

14. The computerized apparatus of claim 13, wherein the high performance disk drives in the high performance disk group consist of at least one solid state drive; and
wherein the lower performance disk drives in the lower performance disk group consist of at least one magnetic hard disk drive.

15. The computerized apparatus of claim 14, wherein the program code, when executed by the processing circuitry, further causes the processing circuitry to migrate the host data stored on the units of storage in the demotion set to units of storage allocated from the lower performance disk group at least in part by allocating units of storage from the lower performance disk group to store the host data stored on the units of storage in the demotion set.

16. The computerized apparatus of claim 15, wherein the storage objects in the storage group comprise logical disks (LUNS) that are used by the application to store host data; and
wherein the program code, when executed by the processing circuitry, further causes the processing circuitry to, after the units of storage in the demotion set are deallocated, allocate the units of storage in the demotion set to a storage object contained in another storage group in response to detecting that the other storage group is missing a service level objective associated with that storage group, wherein the storage object contained in the other storage group is a logical disk (LUN).

17. The computerized apparatus of claim 10, wherein the storage objects in the storage group comprise virtual volumes that are used by the application to store host data.

18. The computerized apparatus of claim 10, wherein the storage objects in the storage group comprise host file systems that are used by the application to store host data.

19. A computer program product, comprising:
a non-transitory computer readable medium storing program code for proactively releasing high performance storage resources, the set of instructions, when carried out by at least one processor in a storage processor in a data storage system, causing the processor to perform a method of:
allocating units of storage from multiple physical disk groups to one or more storage objects in a storage group, wherein the storage objects are used by at least one application to store host data, wherein the multiple physical disk groups include a high performance disk group made up of one or more high performance disk drives and at least one lower performance disk group made up of one or more lower performance disk drives, wherein the storage group is associated with a service level objective, and wherein the service level objective comprises an average response time target for I/O operations performed on the storage objects in the storage group;
calculating a load score for each one of the units of storage allocated to the storage group from the high performance disk group;
determining a minimum load score equal to the lowest load score among the load scores calculated for the units of storage allocated from the high performance disk group to the storage group;
detecting that an average response time for the storage group is exceeding the service level objective associated with the storage group; and
in response to detecting that the average response time for the storage group is exceeding the service level objective associated with the storage group,
calculating a demotion threshold based on the minimum load score, wherein the demotion threshold is a product of multiplying the minimum load score and a demotion range factor,
identifying a demotion set made up of units of storage allocated to the storage group from the high performance disk group that have load scores that are less than or equal to the demotion threshold,
migrating host data stored on the units of storage in the demotion set to units of storage allocated from the lower performance disk group, and
deallocating the units of storage in the demotion set so that they are available for subsequent reallocation by the storage processor to store host data subsequently received by the storage processor.

* * * * *